(12) United States Patent
LaMont et al.

(10) Patent No.: US 9,573,823 B2
(45) Date of Patent: Feb. 21, 2017

(54) LIQUID-PHASE CHEMICAL LOOPING ENERGY GENERATOR

(75) Inventors: David C. LaMont, Calgary (CA); James Seaba, Bartlesville, OK (US); Edward G. Latimer, Ponca City, OK (US); Alexandru Platon, Bartlesville, OK (US)

(73) Assignee: PHILLIPS 66 COMPANY, Houston, TX (US)

( * ) Notice: Subject to any disclaimer, the term of this patent is extended or adjusted under 35 U.S.C. 154(b) by 1099 days.

(21) Appl. No.: 12/910,447

(22) Filed: Oct. 22, 2010

(65) Prior Publication Data

US 2011/0117004 A1 May 19, 2011

Related U.S. Application Data

(60) Provisional application No. 61/262,774, filed on Nov. 19, 2009.

(51) Int. Cl.

| | |
|---|---|
| *C01G 39/02* | (2006.01) |
| *C01G 3/02* | (2006.01) |
| *C01G 29/00* | (2006.01) |
| *C01G 31/02* | (2006.01) |
| *C01G 45/02* | (2006.01) |
| *B01J 10/00* | (2006.01) |

(52) U.S. Cl.
CPC .............. *C01G 39/02* (2013.01); *B01J 10/005* (2013.01); *C01G 3/02* (2013.01); *C01G 29/00* (2013.01); *C01G 31/02* (2013.01); *C01G 45/02* (2013.01); *F23C 2900/99008* (2013.01); *Y02E 20/346* (2013.01)

(58) Field of Classification Search
CPC .......... B01J 10/005; C01G 29/00; C01G 3/02; C01G 31/02; C01G 39/02; C01G 45/02; F23C 2900/99008; Y02E 20/346; C01B 31/20; C01B 3/02

USPC ..... 422/198, 129, 500; 423/437.1, 605, 604, 423/617, 594.17, 606
See application file for complete search history.

(56) References Cited

U.S. PATENT DOCUMENTS

| | | | |
|---|---|---|---|
| 3,855,386 A | 12/1974 | Moore | |
| 3,911,081 A | 10/1975 | Maness et al. | |
| 3,945,804 A * | 3/1976 | Shang et al. | 422/127 |
| 4,883,889 A | 11/1989 | Pennington | |
| 5,427,761 A | 6/1995 | Grindatto et al. | |
| 5,447,024 A | 9/1995 | Ishida et al. | |
| 5,478,370 A * | 12/1995 | Spangler | 48/197 R |
| 5,827,496 A | 10/1998 | Lyon | |
| 6,214,305 B1 * | 4/2001 | van Harderveld et al. | 423/212 |
| 6,475,454 B1 * | 11/2002 | Cole et al. | 423/246 |

(Continued)

FOREIGN PATENT DOCUMENTS

| | | |
|---|---|---|
| FR | 2897862 | 12/2009 |
| KR | 20020048045 | 6/2002 |
| KR | 20030044472 | 6/2003 |

OTHER PUBLICATIONS

Mattisson, Tobias, and Anders Lyngfelt. "Applications of chemical-looping combustion with capture of CO2." Second Nordic Minisymposium on CO2 Capture and Storage, Göteborg, Sweden (2001).*

(Continued)

*Primary Examiner* — Richard M Rump
(74) *Attorney, Agent, or Firm* — Phillips 66 Company

(57) ABSTRACT

A closed loop combustion system for the combustion of fuels using a molten metal oxide bed.

11 Claims, 2 Drawing Sheets

(56) References Cited

U.S. PATENT DOCUMENTS

| | | | |
|---|---|---|---|
| 6,663,681 B2* | 12/2003 | Kindig et al. | 48/127.5 |
| 6,682,714 B2 | 1/2004 | Kindig et al. | |
| 6,685,754 B2 | 2/2004 | Kindig et al. | |
| 2008/0164443 A1* | 7/2008 | White | B01J 23/002 252/373 |

OTHER PUBLICATIONS

Garcia-Labiano, Francisco, et al. "Effect of pressure on the behavior of copper-, iron-, and nickel-based oxygen carriers for chemical-looping combustion." Energy & Fuels 20.1 (2006): 26-33.*

Chaudhury, et al., Kinetics and mechanism of carbothermic reduction of Mo03 to Mo2C. Fuel Chemistry Division, Bhabha Atomic Research Centre, Mumbai-400 085, India. Journal of Alloys and Compounds (1997), 261(1-2), 105-113. Publisher: Elsevier, CODEN: JALCEU ISSN: 0925-8388. Journal written in English. CAN 127:311825 AN 1997:666274 CAPLUS (Copyright (C) 2008 ACS on SciFinder (R)).

Ledoux, et al., Catalysis with carbides. Laboratoire de Chimie des Materiaux Catalytiques, ECPM-Universite, Strasbourg, Fr. Current Opinion in Solid State & Materials Science (1996), 1(1), 96-100. Publisher: Current Science, CODEN: COSSFX ISSN: 1359-0286. Journal; General Review written in English. CAN 125:96969 AN 1996:459163 CAPLUS (Copyright (C) 2008 ACS on SciFinder (R)).

Bowker, et al., Contrasting the behavior of Mo03 and Mo02 for the oxidation of methanol. School of Chemistry, Cardiff University, Cardiff, UK. Catalysis Letters (2008), 120(1-2), 34-39. Publisher: Springer, CODEN: CALEER ISSN: 1011-372X. Journal written in English. CAN 148:331238 AN 2008:226811 CAPLUS (Copyright (C) 2008 ACS on SciFinder (R)).

Wen, et al., In situ time-resolved characterization of novel Cu—Mo02 catalysts during the water-gas shift reaction. Chemistry Department, Brookhaven National Laboratory, Upton, NY, USA Catalysis Letters (2007), 113(1-2), 1-6. Publisher: Springer, CODEN: CALEER ISSN: 1011-372X. Journal written in English. CAN 146:444505 AN 2007:207601 CAPLUS (Copyright (C) 2008 ACS on SciFinder (R)).

Ovalles, et al., Use of a Dispersed Molybdenum Catalyst and Mechanistic Studies for Upgrading Extra-Heavy Crude Oil Using Methane as Source of Hydrogen. INTEVEP S. A, Caracas, Venez. Energy & Fuels (1998), 12(2), 379-385. Publisher: American Chemical Society, CODEN: ENFUEM ISSN: 0887-0624. Journal written in English. CAN 128:130091 AN 1998:127060 CAPLUS (Copyright (C) 2008 ACS on SciFinder (R)).

Moreno-Castilla, et al., Air gasification of activated carbons and chars catalyzed by chromium oxide (Cr203) and molybdenum oxide (Mo02). , J. Fac.Cienc., Univ. Granada, Granada, Spain. Fuel (1990), 69(3), 354-61. CODEN: FUELAC ISSN: 0016-2361. Journal written in English. CAN 112:161973 AN 1990:161973 CAPLUS (Copyright (C) 2008 ACS on SciFinder (R)).

Ghosh, Isobaric ternary phase diagrams for the molybdenum-carbon-oxygen system at 1600.deg. Indian Inst. Technol., Kanpur, India. Journal of the Less-Common Metals (1969), 17(3), 329-33. CODEN: JCOMAH ISSN: 0022-5088. Journal written in English. CAN 70:100285 AN 1969:100285 CAPLUS (Copyright (C) 2008 ACS on SciFinder (R)).

Mobin, et al., Studies on the interactions of transition metal oxides and sodium sulfate in the temperature range 900-1200 K in oxygen. U. Dep. Applied Chem., Aligarh Muslim Univ., Aligarh, India. Journal of Alloys and Compounds (1996), 235(1), 97103. Publisher: Elsevier, CODEN: JALCEU ISSN: 0925-8388. Journal written in English. CAN 124:267328 AN 1996:238314 CAPLUS (Copyright (C) 2008 ACS on SciFinder (R)).

Zeng, et al., Na2SO4-induced hot corrosion of Ni3Al—Fe intermetallic compound at intermediate temperatures. Inst. Corros. Protect. Metal, Chinese Acad. ScL, Peop. Rep. China. Jinshu Xuebao (1994), 30(9), 83988402. Publisher: Kexue, CODEN: CHSPA4 ISSN: 0412-1961. Journal written in Chinese. CAN 122:86899 AN 1995:247546 CAPLUS (Copyright (C) 2008 ACS on SciFinder (R)).

Stein, et al., Damage by high-temperature corrosion. VE8 Leuna-Werke "Walter Ulbricht", Leuna, Ger. Oem. Rep. Korrosion (Dresden) (1985), 16(1), 45-52. CODEN: KRRSAU ISSN: 0368-6752. Journal written in German. CAN 103:25641 AN 1985:425641 CAPLUS (Copyright (C) 2008 ACS on SciFinder (R)).

Fryburg, et al., Hot corrosion studies of four nickel-base superalloys: 8-1900, NASA-TRW VIA, 713C and IN738. Carl A. Lewis Res. Cent., NASA, Cleveland, OH, USA. Proceedings—Electrochemical Society (1976), 77-1 (Proc. Symp. Prop. High Temp. Alloys, 1976), 585-94. CODEN: PESODO ISSN: 0161-6374. Journal written in English. CAN 89:78853 AN 1978:478853 CAPLUS (Copyright (C) 2008 ACS on SciFinder.

Afanasiev, et al., Reactivity of V205, Mo03 and W03 in molten KN03, studied by mass spectrometry. Institut de Recherche sur la Catalyse, Villeurbanne, Fr. Journal of Alloys and Compounds (2001), 322(1-2), 97-102. Publisher: Elsevier Science SA, CODEN: JALCEU ISSN: 0925-8388. Journal written in English. CAN 135:235300 AN 2001 :409977 CAPLUS (Copyright (C) 2008 ACS on SciFinder (R)).

Van Setten, et al., Ceramic foam as a potential molten salt oxidation catalyst support in the removal of soot from diesel exhaust gas. Section Industrial Catalysis, Faculty of Applied Sciences, Delft University of Technology, Delft, Neth. Catalysis Today (1999), 53(4), 613-621. Publisher: Elsevier Science B.v., CODEN: CATTEA ISSN: 0920-5861. Journal written in English. CAN.

Van Setten, et al., The potential of supported molten salts in the removal of soot from diesel exhaust gas. Faculty of Applied Sciences, Section Industrial Catalysis, Delft University of Technology, Julianalaan 136, Delft, Neth. Applied Catalysis, B: Environmental (1999), 21(1), 51-61. Publisher: Elsevier Science BV., CODEN: ACBEE3 ISSN: 0926-3373. Journal written in English. CAN 131 :8780 AN 1999:266107 CAPLUS (Copyright (C) 2008 ACS on SciFinder (R)).

Jelles, et al., Molten salts as promising catalysts for oxidation of diesel soot: importance of experimental conditions in testing procedures. Faculty of Applied Sciences, Section Industrial Catalysis, Delft University of Technology, Julianalaan 136, Delft, Neth. Applied Catalysis, B: Environmental (1999), 21(1), 35-49. Publisher: Elsevier Science by, CODEN: ACBEE3 ISSN: 0926-3373. Journal written in English. CAN 131 :62458 AN 1999:266106 CAPLUS (Copyright (C).

Kostikov, et al., Some physical properties of liqUid refractory metals and oxide.USSR. Sbornik—Moskovskii Institut Stali i Splavov (1968), No. 49 106-13. CODEN: SMSSAK ISSN: 0371-1242. Journal written in Russian. CAN 70:22584 AN 1969:22584 CAPLUS (Copyright (C) 2008 ACS on SciFinder (R)).

Van Arken, et al., The electrical conductivity of molten oxides. Natl. Research Council, Ottawa, Canadian Journal of Chemistry (1953), 31 1009-19. CODEN: CJCHAG ISSN: 0008-4042. Journal language unavailable. CAN 48:63046 AN 1954:63046 CAPLUS (Copyright (C) 2008 ACS on SciFinder (R)).

Nikitina, et al., Temperature dependence of the viscosities of molten B203 containing CoO, NiO, or Mo03. Politekh. Inst., Yekaterinburg, Russia. Zhurnal Fizicheskoi Khimii (1993), 67(9), 1784-6. CODEN: ZFKHA9 ISSN: 0044-4537. Journal written in Russian. CAN 120:174865 AN 1994:174865 CAPLUS (Copyright (C) 2008 ACS on SciFinder (R)).

Gossink, Properties of vitreous and molten alkali molybdates and tungstates. Gloeilampenfabr., Eindhoven, Neth. Philips Research Reports, Supplements (1971), (3), p. 99-102, 107 CODEN: PRSSAM ISSN: 0554-0615. Journal written in English. CAN 76:27642 AN 1972:27642 CAPLUS (Copyright (C) 2008 ACS on SciFinder (R)).

Swaminathan, et al., Vanadic hot corrosion-creep interaction of Superni-C276 in the temperature range range 650-750° C. Dep. Metallurgical Eng., Indian Inst. Technology, Madras, India. High Temperature Materials and Processes (1994), 13(4), 27797. Publisher: Freund, CODEN: HTMPEF ISSN: 0334-6455. Journal written in English. CAN 122:112173 AN 1995:314849 CAPLUS (Copyright (C) 2008 ACS on SciFinder (R)).

(56) References Cited

OTHER PUBLICATIONS

Zeng, et al., Na2SO4-induced hot corrosion of Ni3Al—Fe intermetallic compound at intermediate temperatures. Jianting. Inst. Corros. Protect. Metal, Chinese Acad. ScL, Peop. Rep. China. Jinshu Xuebao (1994), 30(9), B398B402. Publisher: Kexue, CODEN: CHSPA4 ISSN: 0412-1961. Journal written in Chinese. CAN 122:86899 AN 1995:247546 CAPLUS (Copyright (C) 2008 ACS on SciFinder (R)).

Menzies, et al., Some aspects of the hot corrosion of Nimonic alloy 105 in molten sodium sulfate at 1173 Univ. Technol., Loughborough/Leics., UK. Proc.—Int. Congr. Met. Corros. (1984), 4 323-8. Publisher: NRCC, Ottawa, Ont CODEN: 53XYAZ Conference written in English. CAN 103:91565 AN 1985:491565 CAPLUS (Copyright (C) 2008 ACS on SciFinder (R)).

Appen, et al., Corrosive activity of silicate melts. Zhurnal Prikladnoi Khimii (Sankt-Peterburg, Russian Federation) (1967), 40(7), 1469-73. CODEN: ZPKHAB ISSN: 0044-4618. Journal written in Russian. CAN 67:102250 AN 1967:502250 CAPLUS (Copyright (C) 2008 ACS on SciFinder (R)).

Jones, E.S., et al., The oxidation of molybdenum., W. Ohio State Univ., Columbus, Corrosion (Houston, TX, United States) (1958), 14 2t-8t.CODEN: CORRAK ISSN: 0010-9312. Journal language unavailable. CAN 52:15377 AN 1958:15377 CAPLUS (Copyright (C) 2008 ACS on SciFinder (R)).

Brenner, S.S., Catastrophic oxidation of some molybdenum-containing alloys. General Elec. Co., Schenectady, NY, Journal of the Electrochemical Society (1955), 102 16-21. CODEN: JESOAN ISSN: 0013-4651. Journal language unavailable. CAN 50:4242 AN 1956:4242 CAPLUS (Copyright (C) 2008 ACS on SciFinder (R)).

Meijering, J., et al., Rapid oxidation of metals and alloys in the presence of molybdenum trioxide. G. W. Philipps' Research Labs., Gloeilampenfabrieken, Eindhoven, Neth. Nature (London, United Kingdom) (1950), 165 240-1. CODEN: NATUAS ISSN: 0028-0836. Journal language unavailable. CAN 44:27213 AN 1950:27213 CAPLUS (Copyright (C) 2008 ACS on SciFinder (R)).

Yan, L.; Properties of carbide-metal cermets prepared from composite powders by direct reduction and carburization process, State Key Lab. Advanced Tech. for Materials Synthesis & Processing, Wuhan Univ. of Tech. vols. 368-372 (2008) pp. 1099-1103.

Barthos, R., et al. Hydrogen production in the decomposition and steam reforming of methanol on Mo2C/carbon catalysts; Journal of Catalysis 249 (2007) 289-299.

Jerndal, et al., Thermal analysis of chemical-looping combustion, Trans IChemE, Part A Chem. Eng. Res. and Des. 84: 795-806 (2006).

McGlashan, "Chemical looping combustion—a thermodynamic study" Proc. IMechE, Part C: J. Mech. Eng. Sci. 222: 1005-1019 (2008).

Ishida, M., and Jin, N. (1997). "$CO_2$ Recovery in a power plant with chemical looping combustion". Energy Conv. Mgmt. 38: S187-S192.

Brandvoll, et al. "Inherent $CO_2$ capture using chemical looping combustion in a natural gas fired cycle". Trans. ASME 126: 316-21 (2004).

Yan, et al., "Properties of carbide-metal cermets prepared from composite powders by direct reduction and carburization process" Key Engineering Materials Pt. 2, High-Performance Ceramics V 368-372:1099-1103 (2008).

Barthos, et al., "Hydrogen production in the decomposition and steam reforming of methanol on MoZClcarbon catalysts." Journal of Catalysis (2007), 249(2), 289-299. (2008).

PCT/US10/53824 International Search Report (Form PCT/ISA/220) dated Dec. 29, 2010.

* cited by examiner

LIQUID-PHASE CHEMICAL LOOPING ENERGY GENERATOR

CROSS REFERENCE TO RELATED APPLICATIONS

This application is a non-provisional application which claims benefit under 35 USC §119(e) to U.S. Provisional Application Ser. No. 61/262,774 filed Nov. 19, 2009, entitled "LIQUID-PHASE CHEMICAL LOOPING ENERGY GENERATOR," which is incorporated herein in its entirety.

STATEMENT OF FEDERALLY SPONSORED RESEARCH

None.

FIELD OF THE DISCLOSURE

The present disclosure generally relates to methods and apparatus for chemical looping combustion, particularly to a molten metal oxide catalyst for chemical looping combustion.

BACKGROUND OF THE DISCLOSURE

Chemical looping combustion (CLC) is generally characterized by 2 fundamental stages. In the first stage a solid material, typically desirably sized solid particles of metal oxide, are contacted with a carbon containing fuel such that the metal oxide gives up its oxygen to the fuel, forming carbon dioxide and a reduced state material. Depending on the materials and fuels, this step may generate or consume heat. In the second stage, the reduced state material is regenerated in the absence of fuel by exposing it to air where the oxygen oxidizes the reduced state material to regenerate a fully oxidized species. In conventional CLC, this step always results in the release of heat. The regenerated metal oxide is then available to repeat the cycle with more fuel. Typical metal oxides used for CLC include nickel oxide, calcium oxide, iron oxide, copper oxide, manganese oxide, and cobalt oxide.

Traditionally, a CLC system employs a dual fluidized bed system (circulating fluidized bed process) where a metal oxide is employed as a bed material providing the oxygen for combustion in the fuel reactor. The reduced metal is then transferred to the second bed (air reactor) and re-oxidized before being reintroduced back to the fuel reactor completing the loop. Isolation of the fuel from air reduces the number of discrete process steps needed to capture the $CO_2$ generated from fuel combustion.

Many methods have been developed for purposes of $CO_2$ capture: amine scrubbing, oxy-combustion, and/or pre-combustion decarbonization. In amine scrubbing, flue gas is typically treated with an organic amine that selectively traps the $CO_2$ then the $CO_2$ is subsequently released in pure form as the amine is regenerated. Oxy-combustion uses purified oxygen during combustion to generate a flue gas that is predominantly $CO_2$. Alternatively, pre-combustion decarbonization also called gasification, when used for $CO_2$ capture, converts the fuel to a mixture of predominantly $CO_2$ and $H_2$. The $CO_2$ can be separated from the $H_2$ prior to combustion of the $H_2$, thus resulting in only $H_2O$ being produced from combustion. Unfortunately these clean combustion methods require large supplemental energy for $CO_2$ capture greatly reducing their overall combustion efficiency. CLC generates clean energy from a carbonaceous fuel without an air separation unit, without a thermal regeneration step, and without the need to separate $CO_2$ from $H_2$, all of which require both expensive capital and require large amounts of electrical, thermal and/or mechanical energy.

Prior research has shown that CLC can be used to generate power. Ishida, et al., U.S. Pat. No. 5,447,024, use a metal oxide (MO) oxygen carrier including nickel oxide (NiO), yttrium-stabilized zirconium ($ZrO_2$), as well as iron (Fe), copper (Cu) and manganese (Mn) oxides to combust fuel (RH) including methane ($CH_4$) while moistened air is used to regenerate the metal oxide carrier. This process uses low temperature fuel combustion and generates heat when the MO is regenerated with moistened air. Van Harderveld, U.S. Pat. No. 6,214,305, oxidize liquid and solid contaminants in diesel exhaust by passing contaminated exhaust gas through a particulate separator with serially-arranged catalytic plates arranged so that there is no net gas flow in the space between two adjacent vertical plates. The catalytic plates contain a mixture of metal salts and metal oxides including vanadium, molybdenum, molybdenum oxide, iron, platinum, palladium and alkali metals that oxidize soot. Although van Harderveld discloses the metal salt and metal oxide mixtures may become molten at reaction temperatures, a solid metal or ceramic support is required to maintain catalytic activity for these metal mixtures with low melting points. Lyon, U.S. Pat. No. 5,827,496, uses cyclic exposure of a catalytic reaction bed including metal oxides to a reducing gas and molecular oxygen to reduce and oxidize a fuel on the combustion catalyst. Lyon uses silver/silver oxide, copper/copper oxide, iron/iron oxide, cobalt/cobalt oxide, tungsten/tungsten oxide, manganese/manganese oxide, molybdenum/molybdenum oxide, strontium sulfide/strontium sulfate, barium sulfide/barium sulfate, and mixtures thereof for a catalytic reaction bed.

Yao and associates, (Yao, 2008) use a transition-metal carbide including $Cr_2O_3$, $MoO_3$, $V_2O_5$, $Nb_2O_5$ and $TiO_2$ with cementing-metal oxides $CO_3O_4$ and NiO, and carbon black as composite powders such as $Cr_3C_2$—Co, $Mo_2C$—Co, VC—Co, NbC—Co and Tic-Ni, for direct reduction and carburization. $CO_3O_4$ and NiO improved carbothermal properties for a direct reduction and carburization process.

The main problem with solid oxygen carriers is that they undergo mechanical degradation while being cycled from a reduced state to an oxidized state over and over again, from attrition, erosion, fatigue, crystalline changes, irreversible and side reactions, etc. The result is that the solid carriers turn into ever finer particles, making moving and managing solids quite difficult, and making the useful lifetime of the oxygen carriers uneconomically short. Moreover, continuously moving hot solid particles from one reactor to another is complicated. A simpler system is required that mitigates the movement of the metal/metal oxide at very high temperatures. In addition to mechanical degradation, chemical degradation of the solid oxygen carrier also occurs with each cycle, such that the fraction of the total oxygen carrier available to take part in chemical reactions continuously decreases with use. In practical applications, a small amount of the degraded oxygen carrier is continuously removed from the reaction process and a small amount of fresh oxygen carrier is continuously added, but an improved process would offer an oxygen carrier with an extended useful lifetime.

BRIEF DESCRIPTION OF THE DISCLOSURE

A chemical looping combustion system is provided that uses a molten metal oxide for combustion. Additionally, a molten metal oxide catalyst for chemical looping combustion is also described. In one embodiment, a chemical looping combustion (CLC) system is described including a molten liquid metal oxide, a fuel source, and a reaction chamber, where the molten liquid metal oxide (a) and fuel source (b) react in the reaction chamber. In another embodiment, a chemical looping combustion (CLC) process is described by contacting a mixture of molten metal oxide and a fuel source, oxidizing the fuel source with the molten metal oxide, generating carbon dioxide and one or more reduced species as products, and then subsequently contacting the reduced species with oxygen to regenerate it to a metal oxide.

Molten metal oxides include vanadium pentoxide ($V_2O_5$), manganese (III) oxide ($Mn_2O_3$), copper (I) oxide, copper (II) oxide, molybdenum trioxide ($MoO_3$), bismuth (III) oxide ($Bi_2O_3$) or combinations thereof. In one embodiment, the molten metal oxide is molybdenum trioxide ($MoO_3$). Secondary reactive metal oxides incorporated into the liquid metal oxide include iron (II) oxide ($Fe_2O_3$), cobalt (II) oxide (CoO), nickel (II) oxide (NiO), zinc (II) oxide (ZnO), tin (II) oxide (SnO), tin (IV) oxide ($SnO_2$), antimony (II) oxide ($Sb_2O_3$), tungsten trioxide ($WO_3$), and lead (II) oxide (PbO). Molten metal oxide can be contained within a melt of other molten species including glass melt, ionic melt, and combinations of melts.

Fuel sources include diesel, kerosene, coal, bitumen, crude oil, crude oil distillate, light distillates, naphthas, gasoline, diesel, kerosene, fuel gas, and mixtures of various fuels. Fuel sources may also be gases including methane, propane, volatile organic carbons, vaporized gasoline, synthesis gas, dilution gas, mixture of dilution-synthesis gas and gas mixtures. The fuel source may also be biomass, wood, cellulose, corn stover, waste paper, municipal solid waste and other combustible waste mixtures.

The reaction chamber for the melt may either be a single reaction chamber, a double reaction chamber or a plurality of reaction chambers. Reaction chambers can generate energy indirectly or may be in direct thermal contact with a closed loop system that contains a heat transfer fluid.

The molten metal oxide is contained within a melt of other molten species including glass melt, ionic melt, and combinations thereof. Fuel sources include gas and liquid fuels including methane, vaporized gasoline, diesel, synthesis gas, dilution gas, mixture of dilution-synthesis gas, kerosene, fuel gas, or combinations. In another embodiment, crude oil distillate including light distillates, naphthas, gasoline, diesel, kerosene, and combinations may be used as fuel sources. In another embodiment, gases including methane, propane, volatile organic carbons, fuel gas, synthesis gas, dilution gas, mixture of dilution-synthesis gas and combinations are used as a fuel source.

BRIEF DESCRIPTION OF THE DRAWINGS

The invention may best be understood by reference to the following description taken in conjunction with the accompanying figures.

DETAILED DESCRIPTION OF EMBODIMENTS OF THE INVENTION

Figure 1:
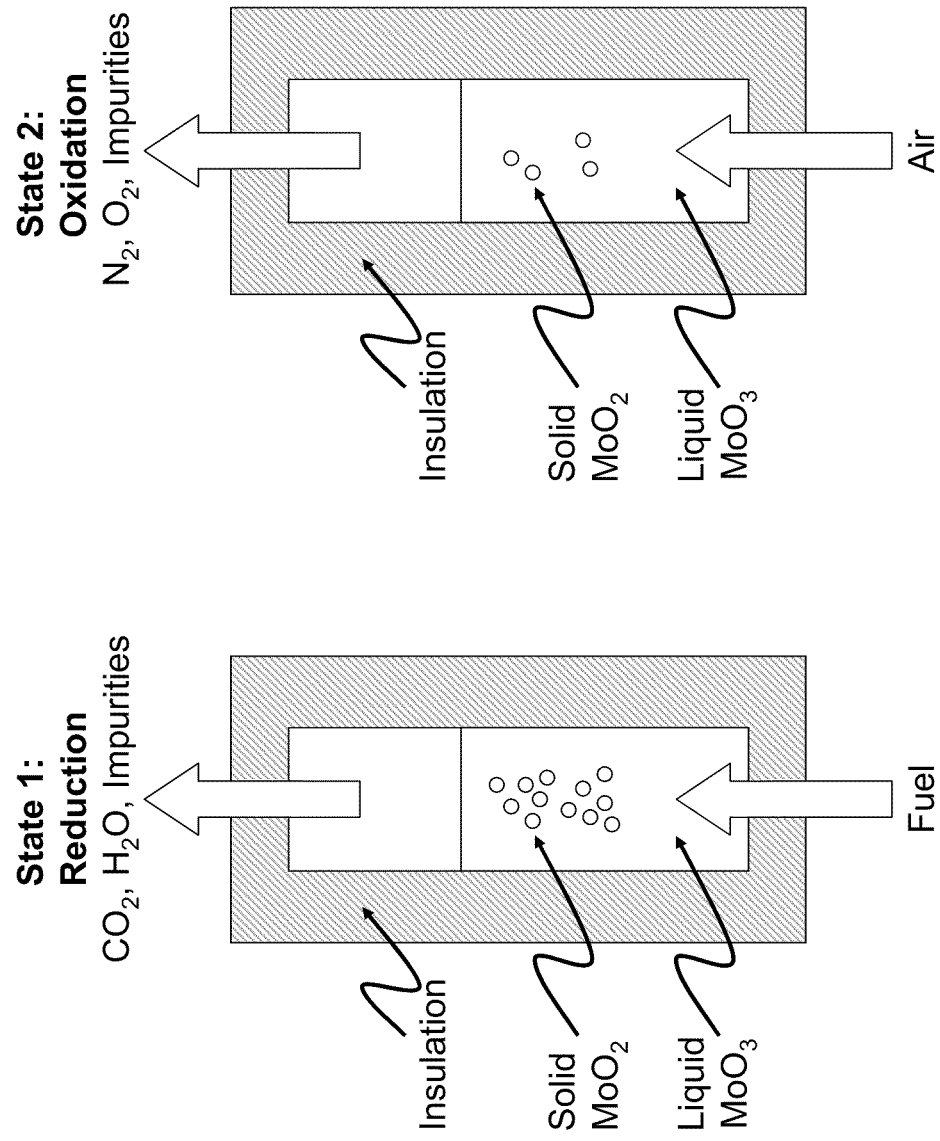
FIG. 1: Molten Metal Oxide CLC Operating States. This figure shows the two operating states between which a single reactor would be switched. In State 1, the reactor is initially charged with the active metal oxide, and then fuel is introduced into the reactor. The ensuing reaction results in the combustion of the fuel and the reduction of the metal oxide to the reduced species. Gases released from combustion are removed from the reactor, and the heat they contain is recovered. In State 2, the reactor initially contains some amount of reduced species, and the flow of fuel has been shut off. Air is then introduced into the reactor, which causes the reduced species to be oxidized back to metal oxide. A hot stream of depleted air exits the reactor, and the heat it contains is recovered. Once the reduced species is mostly or completely oxidized, the reactor is ready for fuel to be introduced once again.
Figure 2:
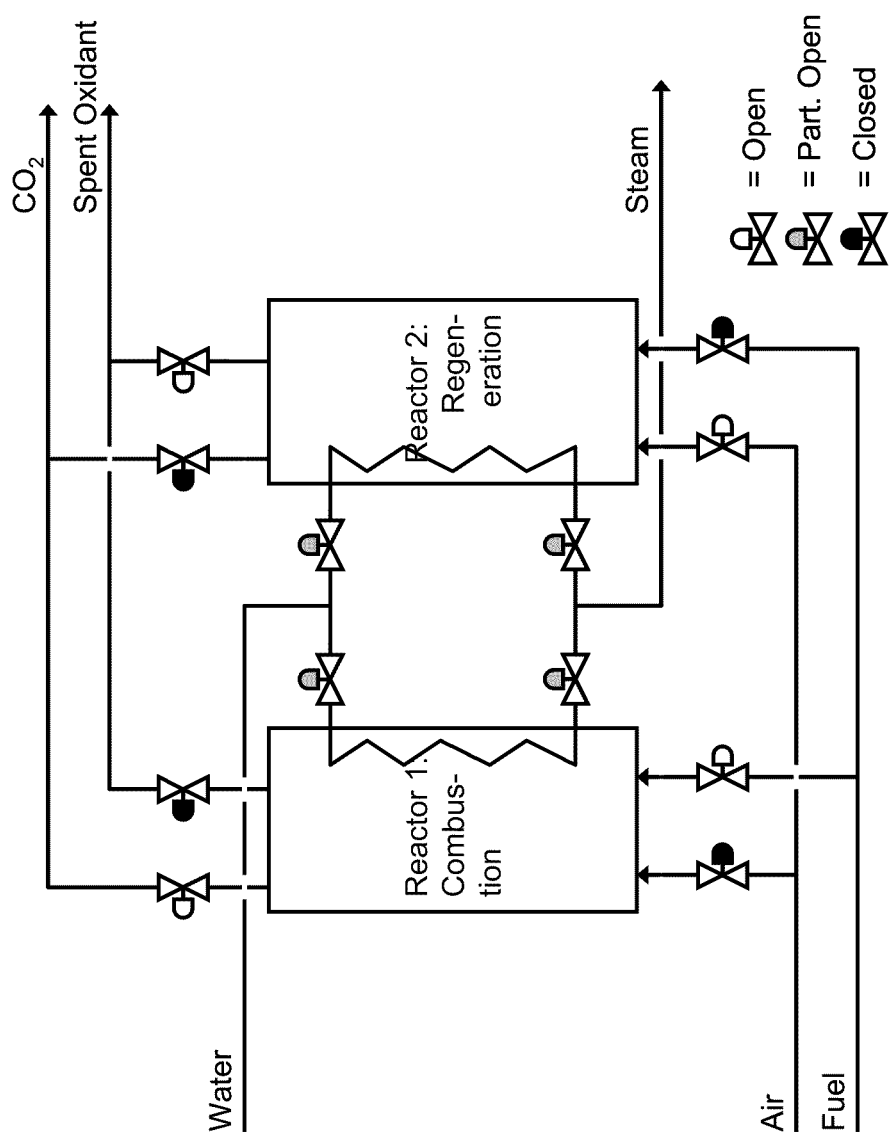
FIG. 2: Two CLC Reactors Connected for Optional Direct Production of Steam. While some or all of the heat from combustion of fuel will leave the reactor with the exhaust gases or the depleted air, this figure also shows how heat may be directly removed from the reactors by way of steam coils. Valve positions are indicated to show that when Reactor 1 is in combustion mode, no air is allowed into the reactor. Similarly, when Reactor 2 is in regeneration mode, no fuel is allowed into the reactor. Because heat may be released during both combustion and regeneration, water may be directed to the steam coils of both reactors in varying proportions during all stages of CLC.

The current invention proposes an improved method for using chemical-looping combustion (CLC) of hydrocarbons as an energy source. In one aspect, the oxygen carrier is a molten metal oxide (as opposed to solid) when it is in an oxidized state, and solid when it is reduced in the presence of a fuel source. The reduced solid may or may not have significant solubility in the molten metal oxide. In a second aspect, the reduced species is not a solid, rather is another molten liquid that may or may not be soluble in the remaining unreacted liquid metal oxide. In a third aspect, the reduced solid species need not be separated from the remaining unreacted metal oxide, rather, it can remain physically mixed with, or dissolved within, the molten oxide. The reduced solid species may be directly oxidized within the mixture by stopping the flow of fuel and initiating the flow of air through the mixture. A fourth aspect is that other materials may be used in combination with the reactive species, which may not participate in any chemical reactions with the fuel or air, but which may be beneficial for controlling melting point, vapor pressure, viscosity, slagging potential, solubility or other chemical or physical properties of the melt. A fifth aspect is that no movement of the molten metal oxide or reduced solid species from one reaction chamber to another is required. A sixth aspect is that the operating state of a particular reactor vessel is controlled by controlling whether fuel or oxidant is flowing to the reactor vessel. A seventh key aspect is that, in addition to capturing heat from the gaseous species leaving the reactor, some heat released from the reactions could also be removed directly from the reactor by a closed-loop system. An eighth key aspect is that the current invention is connected to a $CO_2$ capture system, which would be simple to construct since the product of combustion would be predominantly $CO_2$. In order to minimize subsequent energy demands related to compressing the captured $CO_2$ for transportation and storage, the CLC reactor may be operated at above ambient pressure during the combustion step. Another embodiment uses an array of multiple identical CLC reactors operated in a synchronized manner, wherein the process is cycled through the reactors to maintain steady state combustion and steam production. A ninth key aspect is an embodiment where the steady state steam production from an array of multiple identical CLC reactors is used for power generation, with each CLC reactor being operated in a combination of identical and different stages of the CLC cycle to provide continuous steam for power generation.

An example material is $MoO_3$. Above its melting point of about 795° C., The $MoO_3$ remains fluid until it is reduced by the fuel, causing a phase change to $MoO_2$ solid, the simultaneous generation of product gases, and the generation of heat in some amount equal to a fraction of the heat of combustion of the fuel itself. The use of a liquid phase $MoO_3$ significantly improves the efficacy of the CLC process because there is no solid reaction surface to degrade during repeated looping. The interface of the fuel with the liquid $MoO_3$ is continuously renewed during reaction, helped by the generation of product gases. The $MoO_2$ is regenerated to $MoO_3$ by exposure to air. Summed together, the heat released during this regeneration step in addition to the heat released during the first reduction step is typically equal to the heat of combustion of the fuel itself.

As used herein, metal oxide (MeOx) includes oxides of V, Mn, Cu, Mo, Bi, other metal oxides, and mixtures thereof. For more information about metal oxides see the CRC Handbook of Chemistry and Physics, pp. 4-35 to 4-119 and 5-72 to 5-75, or other standard chemistry resource. The metal oxides for the disclosed process are selected by ensuring that each step of the CLC process is both spontaneous and results in the release of heat. That is to say, in the disclosed process, both the reduction step that generates the reduced species and regeneration of the metal oxide are net exergonic and net exothermic. Thus, as long as the reduction step for all reacting species is net exergonic, metal oxides that undergo net endothermic reduction during their reaction with fuel may be used in combination with metal oxides that undergo net exothermic reduction during their reaction with fuel to tailor a reduction step with a desired amount of exothermicity. The control of reaction energetics simplifies the reactor design, reaction process and ensures high levels of combustion. The regeneration of the reduced species back to its oxide form is exergonic and exothermic for all reactive materials in the disclosed process. In conventional CLC, the reaction with the fuel is often endothermic, which reduces process efficiency and introduces design limitations due to the quenching nature of the combustion step. Table 1 shows a non-exhaustive list of example oxide fuel reactions. While many types of fuel could be used, carbon, methane and carbon monoxide are shown for reference, along with their net combustion enthalpies and free energies of combustion.

TABLE 1

Example Fuel Reactions

| Reactions | ΔH(25° C.) [kJ/mol] | ΔG(25° C.) [kJ/mol] |
|---|---|---|
| Carbon as Fuel | | |
| $V_2O_5 + C = V_2O_3 + CO_2$ | −59.3 | −110.6 |
| $2Mn_2O_3 + C = 4MnO + CO_2$ | −20.6 | −88.0 |
| $2Cu_2O + C = 4Cu + CO_2$ | −52.3 | −98.7 |
| $2CuO + C = 2Cu + CO_2$ | −81.9 | −138.2 |
| $4CuO + C = 2Cu2O + CO_2$ | −111.5 | −177.7 |
| $2MoO_3 + C = 2MoO2 + CO_2$ | −82.9 | −126.4 |
| $0.667Bi_2O_3 + C = 1.333Bi + CO_2$ | −8.0 | −62.8 |
| Methane as Fuel | | |
| $V_2O_5 + 0.5CH_4 = V_2O_3 + 0.5CO_2 + H_2O$ | −67.1 | −116.7 |
| $2Mn_2O_3 + 0.5CH_4 = 4MnO + 0.5CO_2 + H_2O$ | −28.4 | −94.1 |
| $2Cu_2O + 0.5CH_4 = 4Cu + 0.5CO_2 + H_2O$ | −60.1 | −104.8 |
| $2CuO + 0.5CH_4 = 2Cu + 0.5CO_2 + H_2O$ | −89.7 | −144.3 |
| $4CuO + 0.5CH_4 = 2Cu_2O + 0.5CO_2 + H_2O$ | −119.3 | −183.9 |
| $2MoO_3 + 0.5CH_4 = 2MoO_2 + 0.5CO_2 + H_2O$ | −90.7 | −132.5 |
| $0.667Bi_2O_3 + 0.5CH_4 = 1.333Bi + 0.5CO_2 + H_2O$ | −15.9 | −69.1 |
| Carbon Monoxide as Fuel | | |
| $V_2O_5 + 2CO = V_2O_3 + 2CO_2$ | −231.7 | −230.6 |
| $2Mn_2O_3 + 2CO = 4MnO + 2CO_2$ | −193.1 | −208.0 |
| $2Cu_2O + 2CO = 4Cu + 2CO_2$ | −224.7 | −218.7 |
| $2CuO + 2CO = 2Cu + 2CO_2$ | −254.3 | −258.2 |
| $4CuO + 2CO = 2Cu_2O + 2CO_2$ | −283.9 | −297.7 |
| $2MoO_3 + 2CO = 2MoO_2 + 2CO_2$ | −255.3 | −246.4 |
| $0.667Bi_2O3 + 2CO = 1.333Bi + 2CO_2$ | −180.4 | −182.8 |
| Regeneration | | |
| $V_2O_3 + O_2 = V_2O_5$ | −334.2 | −283.8 |
| $4MnO + O_2 = 2Mn_2O_3$ | −372.9 | −306.4 |
| $4Cu + O_2 = 2Cu_2O$ | −341.2 | −295.7 |
| $2Cu + O_2 = 2CuO$ | −311.6 | −256.2 |
| $2Cu_2O + O_2 = 4CuO$ | −282.0 | −216.6 |
| $2MoO_2 + O_2 = 2MoO_3$ | −310.6 | −268.0 |
| $1.333Bi + O_2 = 0.667Bi_2O_3$ | −385.4 | −331.4 |
| Net Reactions | | |
| Carbon: $C + O_2 = CO_2$ | −393.5 | −394.4 |
| Methane: $0.5CH_4 + O_2 = 0.5CO_2 + H_2O$ | −401.3 | −400.5 |
| Carbon Monoxide $2CO + O_2 = 2CO_2$ | −565.9 | −514.4 |

This invention describes an improved method of CLC, in which the oxygen carrier is a molten metal oxide. The molten metal oxide is contained in a reaction vessel, and may be mixed with other materials that control the physical or chemical properties of the bulk melt. In one embodiment a molten $Bi_2O_3$ as one constituent of a molten glassy matrix is mixed with a diesel, synthesis gas, dilution gas, mixture of dilution-synthesis gas, kerosene, fuel gas, or other liquid fuel source. In another embodiment a molten molybdenum oxide is mixed with a methane, vaporized gasoline, diesel, synthesis gas, dilution gas, mixture of dilution-synthesis gas, kerosene, fuel gas, or mixtures thereof. Additionally, molten metal oxide may be mixed with a fine coal, petroleum coke or shale powder to achieve thorough oxidation of the fuel powder. By pulverizing the solid fuels and mixing with a liquid metal oxide, effective combustion may be achieved. In yet another embodiment, molten CuO or $Cu_2O$ is incorporated within a molten glassy matrix, and contacted with biomass, such as wood, cellulose, dried corn stover, waste paper, municipal solid waste, or mixtures thereof. In all the embodiments, fuel is added until a desired amount of the metal oxide is depleted, at which time, the fuel will cease to be added to the reaction vessel. Flow of air into the reaction vessel can then be initiated, which will regenerate the active metal oxides. Because impurities within the fuels may slowly degrade the metal oxides, and ash constituents of the fuel will incorporate into the melt and dilute the metal oxides, some amount of the melt may be removed and fresh metal oxide may be added either continuously or discontinuously during operation.

The following examples of certain embodiments of the invention are given. Each example is provided by way of explanation of the invention, one of many embodiments of the invention, and the following examples should not be read to limit, or define, the scope of the invention.

EXAMPLE 1

Molybdenum Oxide Reaction

In one embodiment a desirable metal oxide would be $MoO_3$. $MoO_3$ has a sufficiently low melting point of approximately 795° C. that conventional reactor materials with standard construction and care may be used to contain the reaction. Assuming the carbonaceous fuel to be pure carbon, the reaction chemistry is as follows:

TABLE 2

Molybdenum Oxide CLC reactions

| Rxn. Type | Rxn. Stoichiometry | Std. Rxn. Enthalpy |
| --- | --- | --- |
| Fuel Oxidation | $2\ MoO_3 + C = 2\ MoO_2 + CO_2$ | −82.9 MJ/mol carbon |
| Oxide Regeneration | $2MoO_2 + O_2 = 2\ MoO_3$ | −310.6 MJ/mol $O_2$ |
| Net | $C + O_2 = CO_2$ | −393.5 MJ/mol |

A reactor contains a pool of molten $MoO_3$ in direct or indirect thermal contact with a closed-loop steam system and a heat recovery system to recover useful heat from the exiting exhaust and regeneration gas streams. In addition, the reactor would also be in contact with a $CO_2$ capture system that captures and prepares the $CO_2$ released from fuel combustion with $MoO_3$ for disposal. The reactor would ideally be operated at pressure such that the $CO_2$ evolved would require minimal additional compression for sequestration. Conventional CLC has multiple reactors, each with a specific function, and solids must be transported between the reactors. The current invention allows for multiple identical reactors to be operated in a cyclic manner, such that as few as one reactor would be sufficient for a process. For power generation, two or more liquid CLC reactors may be required, with each reactor being operated at different stages of combustion/regeneration at a given moment. In one embodiment two reactors are run in alternate with one reactor undergoing combustion while the other reactor is undergoing oxidation.

EXAMPLE 2

Blended Metal Oxides

Metal oxides including molybdenum, vanadium, manganese, copper, and bismuth oxides may be blended. These metal oxides may also be blended with other oxides such as boric oxide, lime and other materials, to change the overall melt temperature, change the upper or lower temperatures of the reaction, and generally to obtain desirable properties of the bulk melt. Refractory materials for the reaction chamber are widely available and include materials such as silicon carbide, chromia, alumina, magnesia, dolomite or combinations. An extensive, but not exhaustive, list of metal oxides that are useful for the refractory, melt, or as a oxide catalyst are listed in Table 3. More strongly ionic species such as nitrate, phosphate, silicate and sulfate metallic salts, are not shown, but could also be used in varying amounts in the melt.

TABLE 3

Metal Species

| | Melting Point [° C.] | Primary Use | Metal Oxide | Melting Point [° C.] | Primary Use |
| --- | --- | --- | --- | --- | --- |
| Group IA | | | | | |
| Li | 186 | n/a | $Li_2O$ | 1,570 | Melt |
| Na | 98 | n/a | $Na_2O$ | 1,132 | Melt |
| K | 62 | n/a | $K_2O$ | 350 d. | Melt |
| Group IIA | | | | | |
| Mg | 651 | n/a | MgO | 2,800 | Melt, Refractory |
| Ca | 810 | n/a | CaO | 2,570 | Melt, Refractory |
| Sr | 800 | n/a | SrO | 2,430 | Melt |
| Ba | 850 | n/a | BaO | 1,923 | Melt |
| Group IIIA | | | | | |
| B | 2,300 | n/a | $B_2O_3$ | 577 | Melt |
| Al | 660 | n/a | $Al_2O_3$ | 2,054 | Melt, Refractory |
| Group IVA | | | | | |
| Si | 1,414 | n/a | $SiO_2$ | 1,710 | Melt, Refractory |
| Sn | 232 | Reactant | SnO | 1,080 | Melt, Reactant |
| Sn | 232 | Reactant | $SnO_2$ | 1127 | Melt, Reactant |
| Pb | 328 | Reactant | PbO | 888 | Melt, Reactant |
| Group VA | | | | | |
| P | n/a | n/a | $P_2O_5$ | 340 | Melt |
| Sb | 73 | Reactant | $Sb_2O_3$ | 656 | Melt, Reactant |
| Bi | 271 | Reactant | $Bi_2O_3$ | 860 | Melt, Reactant |
| Group IIIB | | | | | |
| Sc | 1,200 | n/a | $Sc_2O_3$ | 2,485 | Refractory |
| Y | 1,490 | n/a | $Y_2O_3$ | 2,690 | Refractory |
| Group IVB | | | | | |
| Ti | 1,800 | n/a | $TiO_2$ | 1,843 | Melt |
| Zr | 1,700 | n/a | $ZrO_2$ | 2,715 | Refractory |
| Hf | 2,812 | n/a | $HfO_2$ | 2,760 | Refractory |
| Group VB | | | | | |
| V | 1,710 | n/a | $V_2O_3$ | 1,970 | Melt, Reactant |
| V | 1,710 | n/a | $V_2O_5$ | 800 | Melt, Reactant |
| Nb | 2,750 | n/a | $Nb_2O_3$ | 1,520 | Melt |
| Group VIB | | | | | |
| Cr | 1,615 | n/a | $Cr_2O_3$ | 2,432 | Melt, Refractory |
| Mo | 2,620 | n/a | $MoO_3$ | 795 | Melt, Reactant |
| W | 3,370 | n/a | $WO_3$ | 1,473 | Melt, Reactant |
| Group VIIB | | | | | |
| Mn | 1,244 | n/a | MnO | 1,650 | Melt, Reactant |
| Group VIIIB | | | | | |
| Fe | 1,505 | Reactant | FeO | 1,360 | Melt, Reactant |
| Fe | 1,505 | Reactant | $Fe_2O_3$ | 1,566 | Melt, Reactant |
| Co | 1,480 | Reactant | CoO | 1,800 | Melt, Reactant |
| Ni | 1,452 | Reactant | NiO | 1,984 | Melt, Reactant |
| Group IB | | | | | |
| Cu | 1,083 | Reactant | $Cu_2O$ | 1,235 | Melt, Reactant |
| Cu | 1,083 | Reactant | CuO | 1,026 d. | Melt, Reactant |
| Group IIB | | | | | |
| Zn | 420 | n/a | ZnO | 1,975 | Melt |
| Lanthanides | | | | | |
| Ce | 645 | n/a | $CeO_2$ | 2,600 | Melt |

Although the systems and processes described herein have been described in detail, it should be understood that various changes, substitutions, and alterations can be made without departing from the spirit and scope of the invention as defined by the following claims. Each and every claim is incorporated into the specification as an embodiment of the present invention. Thus, the claims are part of the description and should be deemed to be additional description to the preferred embodiments of the present invention.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:
1. U.S. Pat. No. 5,447,024, Ishida and Hongguang, "Chemical-Looping Combustion Power Generation Plant System." Tokyo Electric Power Co., Inc. (1995).
2. U.S. Pat. No. 5,827,496, Lyon, "Methods And Systems For Heat Transfer By Unmixed Combustion." Energy and Environmental Research Corp. (1998).
3. U.S. Pat. No. 6,214,305, van Harderveld, "Method and apparatus for the treatment of diesel exhaust gas." Technische Universiteit Delft (2001).
4. CRC Handbook of Chemistry and Physics $74^{th}$ Edition, Editor Lide, D. R., CRC Press, Boca Raton, (1993).
5. Jerndal, et al., "Thermal analysis of chemical-looping combustion". Trans IChemE, Part A Chem. Eng. Res. and Des. 84: 795-806 (2006).
6. McGlashan, "Chemical looping combustion—a thermodynamic study" Proc. IMechE, Part C: J. Mech. Eng. Sci. 222: 1005-1019 (2008).
7. Ishida, M., and Jin, N. (1997). "$CO_2$ Recovery in a power plant with chemical looping combustion". Energy Cony. Mgmt. 38: S187-S192.
8. Brandvoll and Bolland, "Inherent $CO_2$ capture using chemical looping combustion in a natural gas fired cycle". Trans. ASME 126: 316-21 (2004).
9. Yan, et al., "Properties of carbide-metal cermets prepared from composite powders by direct reduction and carburization process" Key Engineering Materials Pt. 2, High-Performance Ceramics V 368-372:1099-1103 (2008).
10. Barthos, et al., "Hydrogen production in the decomposition and steam reforming of methanol on MoZClcarbon catalysts." Journal of Catalysis (2007), 249(2), 289-299. (2008).

The invention claimed is:
1. A process of repeated chemical looping combustion (CLC) for the production of energy while arranging for the efficient sequestration of carbon dioxide produced by combustion and oxidation, wherein the process comprises:
   a) providing at least a first reactor and a second reactor, each containing molten metal oxide and each also containing elements of a closed loop system with a heat transfer fluid therein to gather heat from each of the reactors to use in the production of energy;
   b) increasing the pressure of in said first reactor to a first pressure that is above ambient pressure;
   c) conducting a combustion step in said first reactor at said first pressure by contacting the mixture of molten metal oxide with a carbon containing fuel to thereby oxidize said fuel with the molten metal oxide and concurrently reduce the molten metal oxide to generate combustion product that is predominantly carbon dioxide along with reduced metal species within the molten metal oxide wherein the oxygen carrier to the fuel is the molten metal oxide wherein this combustion step further provides heat to the heat transfer fluid for the production of energy;
   d) while conducting the combustion step c) in the first reactor, conducting an oxidation step in the second reactor at a second pressure which is lower that said first pressure by directing a flow of air into the second reactor such that oxygen in the air comes into contact with reduced solids in the second reactor to thereby oxidize such solids to form and reform the solids into molten metal oxide and thereby regenerate the molten metal oxide in the second reactor in preparation for a combustion step wherein this oxidation step provides heat to the heat transfer fluid for the production of energy;
   e) capturing and compressing the carbon dioxide from combustion step c) within the first reactor and directing the carbon dioxide from the combustion step c) to a carbon dioxide sequestration conduit;
   f) directing oxygen depleted air from the second reactor to a spent oxidant conduit wherein the spent oxidant conduit and the carbon dioxide conduit are separate and apart from one another;
   g) stopping the flow of fuel to the first reactor thereby terminating the combustion step therein;
   h) stopping the flow of air to the second reactor thereby terminating the oxidation step therein;
   i) lowering the pressure in the first reactor down to the second pressure;
   j) raising the pressure in the second reactor up to the first pressure;
   k) initiating a flow of air to the first reactor to conduct an oxidation step in the first reactor and also produce and provide heat for the heat transfer fluid in the first reactor;
   l) while conducting the oxidation step in the first reactor, initiating a flow of carbon containing fuel to the second reactor to thereby conduct a combustion step within the second reactor by oxidizing the carbon containing fuel with the molten metal oxide and reducing the molten metal oxide and also produce and provide heat for the heat transfer fluid in the second reactor;
   m) directing oxygen depleted air from the first reactor to the spent oxidant conduit wherein the spent oxidant conduit;
   n) capturing and compressing the carbon dioxide from combustion step l) within the second reactor and directing the carbon dioxide from the combustion step l) to the carbon dioxide sequestration conduit;
   o) stopping the flow of air to the first reactor thereby terminating the oxidation step therein;
   p) stopping the flow of fuel to the second reactor thereby terminating the combustion step therein;
   q) lowering the pressure in the second reactor down to the second pressure; and
   r) continually repeating steps b) through q) to produce energy in each reactor during cyclically repeated combustion and oxidation steps while carbon dioxide is captured at an elevated pressure from each reactor and also kept separate from oxygen depleted air.

2. The process of claim 1, wherein said molten metal oxide (a) is selected from the group consisting of vanadium pentoxide ($V_2O_5$), manganese (III) oxide ($Mn_2O_3$), copper (I) oxide, copper (II) oxide, molybdenum trioxide ($MoO_3$), bismuth (III) oxide ($Bi_2O_3$) or combinations thereof.

3. The process of claim 1, wherein said molten metal oxide (a) is molybdenum trioxide ($MoO_3$).

4. The process of claim 1, wherein secondary metal oxides are also incorporated into the liquid metal oxide (a) are selected from the group consisting of iron (III) oxide ($Fe_2O_3$), cobalt (II) oxide (CoO), nickel (II) oxide (NiO), tin (II) oxide (SnO), tin (IV) oxide ($SnO_2$), antimony (III) oxide ($Sb_2O_3$), tungsten trioxide ($WO_3$), and lead (II) oxide (PbO).

5. The system of claim 1, wherein the molten metal oxide is contained within a melt of other molten species including glass melt, ionic melt, and combinations thereof.

6. The process of claim 1, wherein said fuel source (b) is selected from the group consisting of, diesel, kerosene, coal, bitumen, crude oil, fuel gas, crude oil distillate, light distillates, naphthas, gasoline, or combinations thereof.

7. The process of claim 1, wherein said fuel source (b) is a gas selected from the group consisting of methane, propane, volatile organic carbons, vaporized gasoline, synthesis gas, dilution gas, mixture of dilution-synthesis gas and combinations thereof.

8. The process of claim 1, wherein said fuel source is biomass, wood, cellulose, corn stover, waste paper, municipal solid waste and combinations thereof.

9. The process of claim 5 wherein the molten metal oxide is contained within a melt of other molten species including glass melt.

10. The process of claim 9 wherein the only feedstocks to the molten metal oxide are air and the fuel.

11. The process of claim 1 wherein the molten metal oxide is contacted by the fuel and air, separately.

\* \* \* \* \*